United States Patent
Shinohira et al.

(10) Patent No.: US 9,325,222 B2
(45) Date of Patent: Apr. 26, 2016

(54) LINEAR MOTOR COOLING STRUCTURE

(71) Applicant: SUMITOMO HEAVY INDUSTRIES, LTD., Tokyo (JP)

(72) Inventors: Daisuke Shinohira, Yokosuka (JP); Doutaro Usui, Yokosuka (JP); Takashi Ikeda, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 378 days.

(21) Appl. No.: 13/850,441

(22) Filed: Mar. 26, 2013

(65) Prior Publication Data
US 2013/0257181 A1 Oct. 3, 2013

(30) Foreign Application Priority Data
Mar. 27, 2012 (JP) .................................. 2012-071561

(51) Int. Cl.
*H02K 9/19* (2006.01)
*H02K 41/02* (2006.01)
*H02K 9/22* (2006.01)

(52) U.S. Cl.
CPC .................. *H02K 9/19* (2013.01); *H02K 41/02* (2013.01); *H02K 9/22* (2013.01)

(58) Field of Classification Search
CPC ............ H02K 41/02; H02K 9/19; H02K 9/22
USPC .......................................... 310/12.29, 16, 52
See application file for complete search history.

(56) References Cited

U.S. PATENT DOCUMENTS

| | | | | |
|---|---|---|---|---|
| 4,306,616 A | * | 12/1981 | Woods et al. ................. | 165/136 |
| 4,315,300 A | * | 2/1982 | Parmerlee et al. ............ | 361/703 |
| 4,342,878 A | * | 8/1982 | Wilson et al. ................. | 373/94 |
| 4,393,565 A | * | 7/1983 | Wilson et al. ............. | 29/890.03 |
| 4,397,234 A | * | 8/1983 | Lee et al. ................. | 101/93.29 |
| 4,401,870 A | * | 8/1983 | St-Jean .......................... | 218/26 |
| 5,723,917 A | * | 3/1998 | Chitayat .................... | 310/12.23 |
| 5,864,187 A | * | 1/1999 | Gonzalez ................... | 310/12.29 |
| 6,661,124 B1 | * | 12/2003 | Seki et al. ................. | 310/12.21 |
| 6,806,594 B2 | * | 10/2004 | Koyanagawa et al. ..... | 310/12.04 |
| 6,825,583 B2 | * | 11/2004 | Joung .................... | H02K 41/03 |
| | | | | 310/12.29 |
| 7,345,384 B2 | * | 3/2008 | Yoshida et al. ............ | 310/12.06 |

(Continued)

FOREIGN PATENT DOCUMENTS

EP     2 424 087 A2    2/2012
JP     06-254734 A    9/1994

(Continued)

OTHER PUBLICATIONS

Japanese Office Action dated May 12, 2015 corresponding to Japanese Patent Application No. P2012-071561.

*Primary Examiner* — Alex W Mok
(74) *Attorney, Agent, or Firm* — Squire Patton Boggs (US) LLP

(57) ABSTRACT

A linear motor cooling structure for cooling a coil constituting a driving section of a linear motor includes a flat plate cooling section which forms a flow path for cooling water for cooling the coil in an inside between a plurality of flat plate members by overlapping the plurality of flat plate members, wherein the flat plate cooling section includes an inflow opening for inflow of the cooling water and an outflow opening for outflow of the cooling water, which are respectively provided at both ends thereof, and the flat plate cooling section comes into close contact with the coil.

7 Claims, 10 Drawing Sheets

(56) References Cited

U.S. PATENT DOCUMENTS

| | | | |
|---|---|---|---|
| 7,936,096 B2* | 5/2011 | Shikayama et al. | 310/12.29 |
| 2003/0141769 A1* | 7/2003 | Kubo | 310/12 |
| 2006/0001322 A1* | 1/2006 | Binnard | 310/12 |
| 2006/0017331 A1* | 1/2006 | Desailly | H02K 41/031 310/12.29 |
| 2007/0257563 A1* | 11/2007 | Huang et al. | 310/12 |
| 2009/0072634 A1* | 3/2009 | Vollmer | H02K 41/033 310/12.18 |
| 2011/0181130 A1* | 7/2011 | Yoshida et al. | 310/12.29 |
| 2012/0049658 A1* | 3/2012 | Yoshida et al. | 310/12.29 |
| 2012/0062866 A1* | 3/2012 | Binnard et al. | 355/72 |

FOREIGN PATENT DOCUMENTS

| | | |
|---|---|---|
| JP | 2003-333822 A | 11/2003 |
| JP | 2008-283744 A | 11/2008 |
| JP | 2011-200098 A | 10/2011 |
| WO | WO 2008/152876 A1 | 12/2008 |

* cited by examiner

LINEAR MOTOR COOLING STRUCTURE

INCORPORATION BY REFERENCE

Priority is claimed to Japanese Patent Application No. 2012-071561, filed Mar. 27, 2012, the entire content of which is incorporated herein by reference.

BACKGROUND

1. Technical Field

The present invention relates to a linear motor cooling structure for cooling a coil that constitutes a driving section of a linear motor.

2. Description of the Related Art

In the past, as a linear motor cooling structure, a linear motor cooling structure which includes a coil unit having an approximately I-shaped transverse cross-section and configured so as to cover a coil by a coil mold and further cover the coil mold by an inner wall, and an outer wall surrounding the outside of the coil unit and cools the coil that generates heat, by making a cooling medium flow between the inner wall and the outer wall of the coil unit has been known (refer to the related art, for example).

SUMMARY

According to an embodiment of the present invention, there is provided a linear motor cooling structure for cooling a coil constituting a driving section of a linear motor, including: a flat plate cooling section which forms a flow path for cooling water for cooling the coil inside between a plurality of flat plate members by overlapping the plurality of flat plate members, wherein the flat plate cooling section includes an inflow opening for inflow of the cooling water and an outflow opening for outflow of the cooling water, which are respectively provided at both ends thereof, and the flat plate cooling section comes into close contact with the coil.

DETAILED DESCRIPTION

Figure 1:
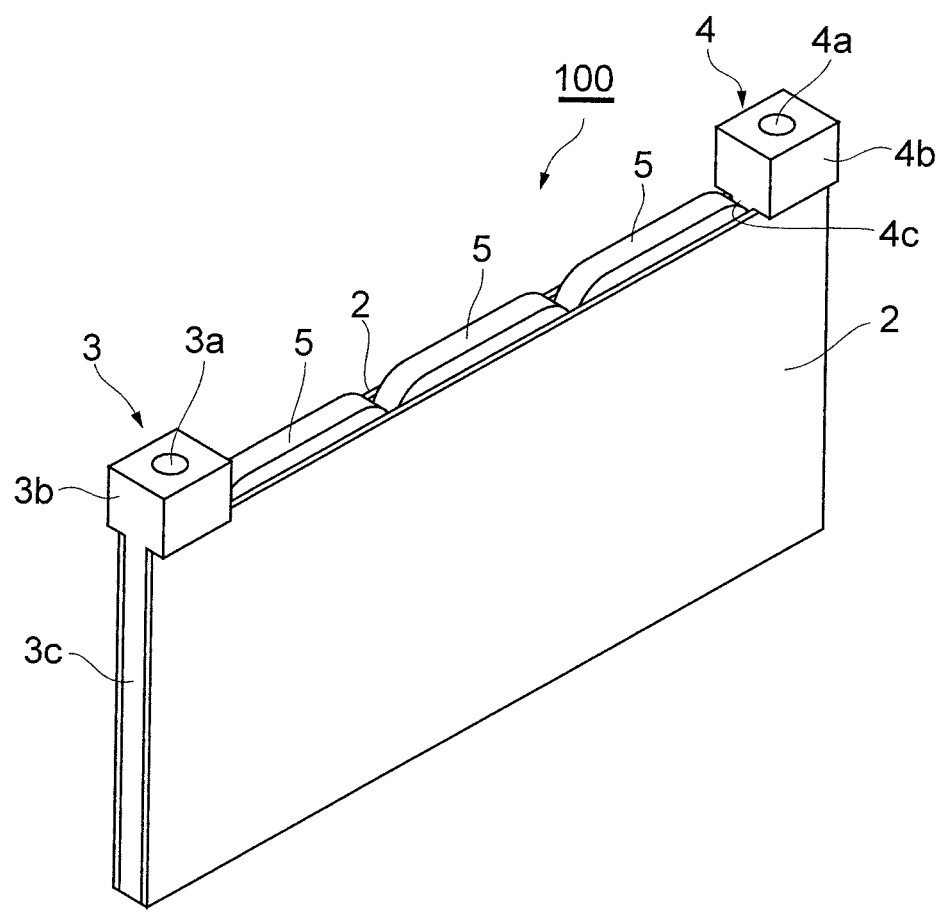
FIG. 1 is a perspective view showing a linear motor cooling structure according to an embodiment of the present invention.

Incidentally, although the linear motor cooling structure according to the related art as described above can efficiently cool the coil, there is a problem in which the structures of the coil unit, the outer wall, and the like are complicated. For this reason, there is also a problem in that manufacturing of the cooling structure is expensive. Accordingly, in such a linear motor cooling structure, it is desired to simplify a configuration.

It is desirable to provide a linear motor cooling structure which efficiently cools a coil and has a simplified configuration.

In the linear motor cooling structure according to an embodiment of the present invention, since a flat plate cooling section having a flow path, through which cooling water flows, inside, is configured only by overlapping a plurality of flat plate members, the configuration of a cooling structure can be simplified. Then, since such a flat plate cooling section performs cooling in direct close contact with a coil, the coil can be efficiently cooled.

Here, as a configuration which effectively exhibits the above-described action, specifically, a configuration can be given in which an inflow opening and an outflow opening are formed as through-holes penetrating in a direction perpendicular to a face of the flat plate member.

Further, as a configuration which effectively exhibits the above-described action, specifically, a configuration can be given in which the flow path of the flat plate cooling section is formed by interposing a member having a non-flat plate shape between the plurality of flat plate members so as to form a portion of overlapping members or by making the flat plate member itself be a non-flat plate shape.

Here, if a first flat plate member has a plurality of inflow openings and a plurality of outflow openings with respect to the flow path, since cooling water more evenly flows through the inside of the flat plate cooling section, compared to a case where each of an inflow opening and an outflow opening is one, the coil can be more efficiently cooled.

Here, as a configuration which effectively exhibits the above-described action, a configuration can be given in which the linear motor cooling structure further includes an inflow section and an outflow section, each of which has a plurality of through-holes that communicates with a plurality of inflow openings and a plurality of outflow openings.

Further, as a configuration which effectively exhibits the above-described action, a configuration can be given in which the inflow section has an inflow opening for introducing the cooling water into the inflow section itself and is provided with a branch structure for introducing the cooling water that has flowed into an inside into the plurality of through-holes.

Furthermore, as a configuration which effectively exhibits the above-described action, a configuration can be given in which the outflow section has an outflow opening for discharging the cooling water from the outflow section itself and is provided with a confluence structure which makes the cooling water flowing into the plurality of through-holes join together and leads the cooling water to the outflow opening.

Further, if the flow path is formed in plural and the flow paths are separated with respect to an adjacent flow path through a partition portion, since the cooling water flows in a direction extending from the inflow opening to the outflow opening in each flow path in a state where the width of a cooling water flow path is narrowed by the partition portion, compared to a case where there is no partition portion and a single flow path is provided, the coil can be even more efficiently cooled.

Further, if the flat plate cooling section has wall portions at portions which are portions around the inflow opening and the outflow opening and at portions other than a portion that is connected to the flow path, the cooling water efficiently flows in a direction extending from the inflow opening to the outflow opening, and thus the coil can be efficiently cooled.

Hereinafter, exemplary embodiments of a linear motor cooling structure according to the present invention will be described referring to FIGS. 1 to 10. In addition, in each drawing, the same element is denoted by the same reference numeral and overlapping description is omitted.

Figure 2:
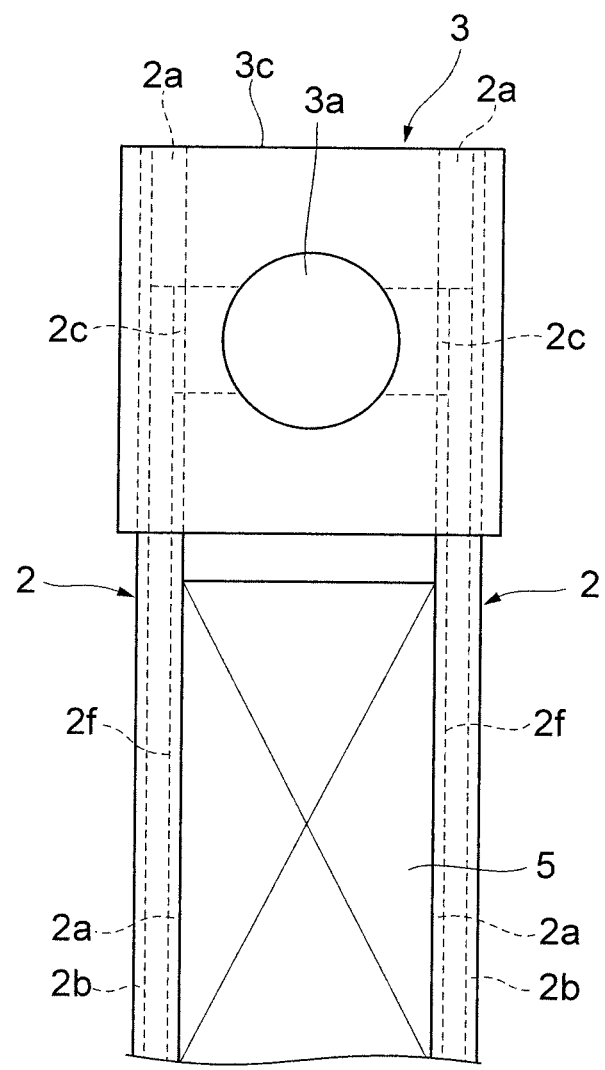
FIG. 2 is a plan view for describing flow paths of a flat plate cooling section and an inflow section in FIG. 1.
Figure 3:
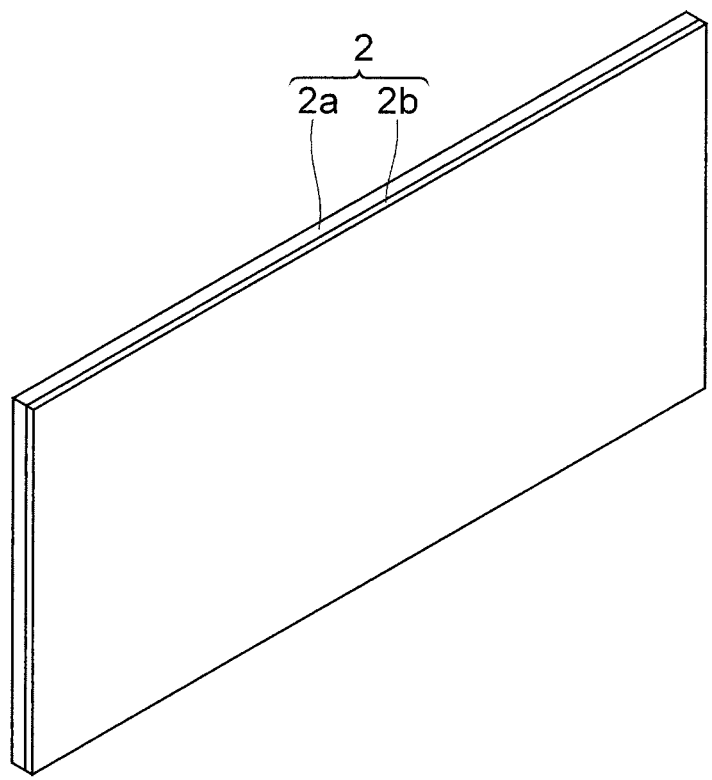
FIG. 3 is a perspective view showing the flat plate cooling section on the front side in FIG. 1.
Figure 4:
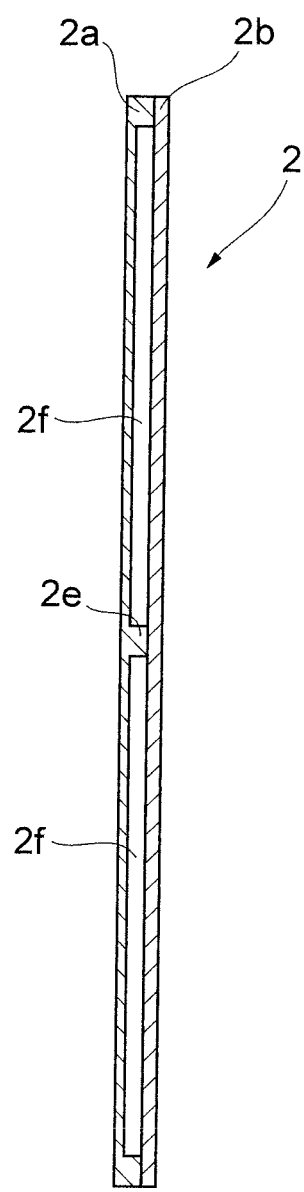
FIG. 4 is a transverse cross-sectional view showing the flat plate cooling section of FIG. 3.
Figure 5:
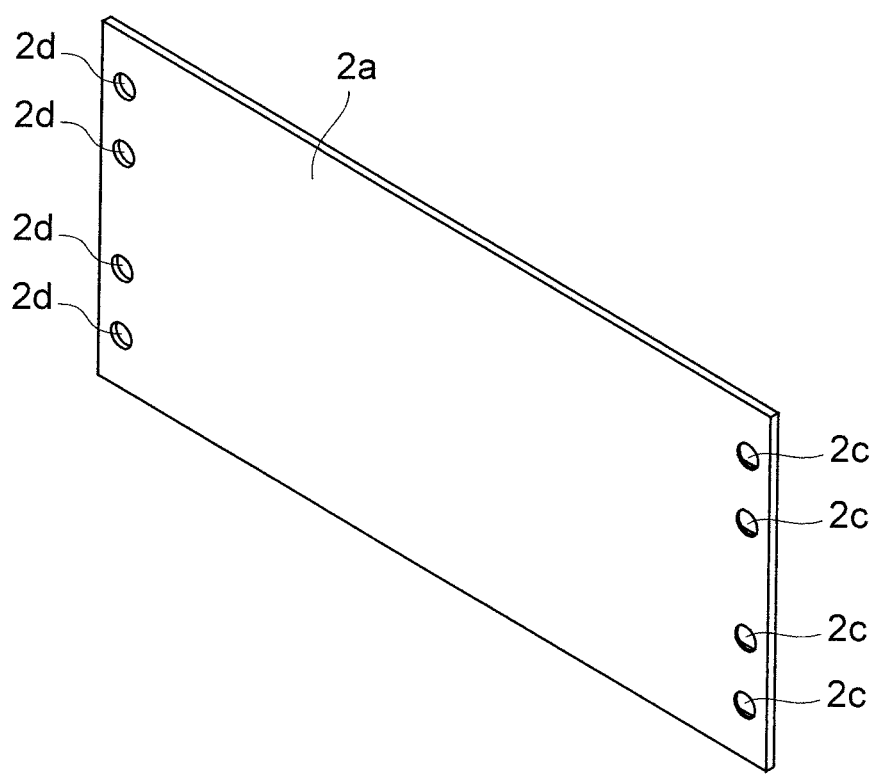
FIG. 5 is a perspective view when a first flat plate member in FIG. 3 is viewed from the back side.
Figure 6:
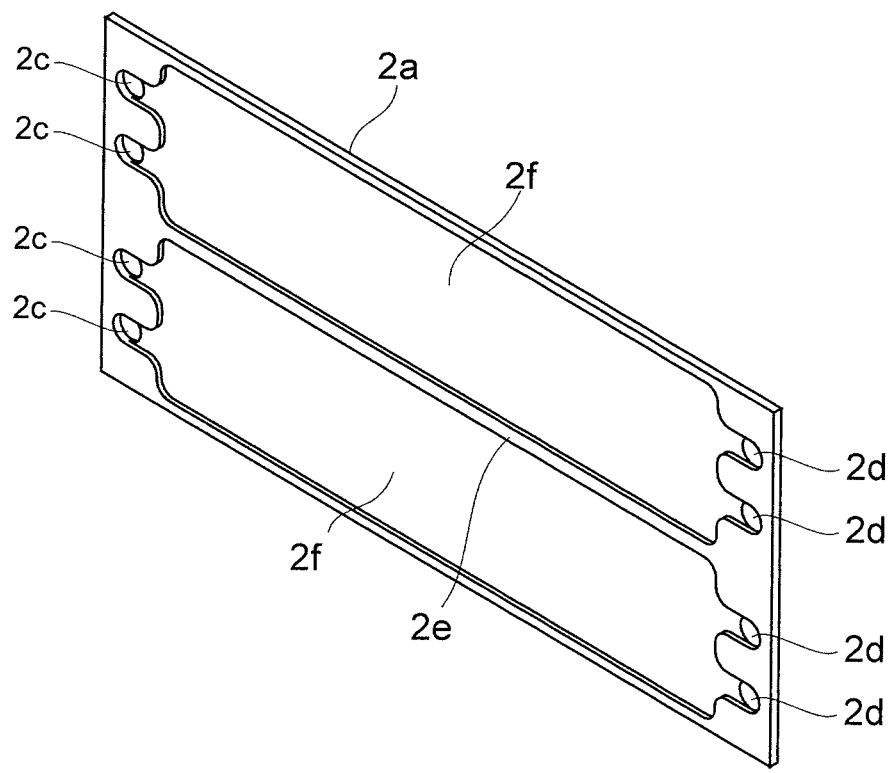
FIG. 6 is a perspective view when the first flat plate member in FIG. 3 is viewed from the front side.

FIG. 1 is a perspective view showing a linear motor cooling structure according to a first embodiment of the present invention, FIG. 2 is a plan view for describing flow paths of a flat plate cooling section and an inflow section in FIG. 1, FIG. 3 is a perspective view showing the flat plate cooling section on the front side in FIG. 1, FIG. 4 is a transverse cross-sectional view showing the flat plate cooling section of FIG. 3. FIG. 5 is a perspective view when a first flat plate member in FIG. 3 is viewed from the back side, and FIG. 6 is a perspective view when the first flat plate member in FIG. 3 is viewed from the front side.

A linear motor with the linear motor cooling structure according to this embodiment applied thereto includes coils 5 (refer to FIG. 1), each of which is wound so as to form a rectangular plate shape and which are arranged in a predetermined direction, and an N-pole magnet (not shown) and an S-pole magnet (not shown) which are alternately continuously arranged to face the coils 5, and is made such that the coils 5 are energized, thereby generating electromagnetic forces between the N-pole magnet and the S-pole magnet, and the coils 5 are moved with a linear motor cooling structure 100 for cooling the coils 5, by the electromagnetic forces. In addition, three coils 5 form a UVW three-phase. The linear motor cooling structure 100 is a cooling structure for the coil 5, which suppresses an increase in the temperature of the coil 5 constituting a driving section of the linear motor, as described above.

As shown in FIGS. 1 and 2, in the linear motor cooling structure 100, two flat plate cooling sections 2 which pinch the coil 5 from both sides are provided. Further, the linear motor cooling structure 100 includes an inflow section 3, into which cooling water flows and which is provided on one end side in an arrangement direction of the coils 5, and an outflow section 4, from which the cooling water flows out and which is provided on the other end side, in addition to the flat plate cooling section 2 and the coil 5.

The flat plate cooling section 2 has a structure in which a first flat plate member 2a and a second flat plate member 2b which have rectangular shapes are laminated, as shown in FIGS. 3 and 4. A material of each of the first flat plate member 2a and the second flat plate member 2b is, for example, metal, ceramic, or resin.

The first flat plate member 2a has four inflow openings 2c which are formed in a circular shape to penetrate a flat plate face on one end side in a longitudinal direction thereof and four outflow openings 2d which are formed in a circular shape to penetrate the flat plate face on the other end side in the longitudinal direction thereof, as shown in FIGS. 5 and 6. In other words, the inflow opening 2c and the outflow opening 2d are formed as through-holes penetrating in a direction perpendicular to a face of the first flat plate member 2a. The inflow openings 2c and the outflow openings 2d are vertically arranged.

Further, the first flat plate member 2a has two concave portions (flow path) 2f which are formed to be recessed with respect to the flat plate face thereof and provided in a pair up and down, and a rib portion 2e which becomes a partition portion partitioning the concave portions 2f arranged up and down on the front side (the front side of FIG. 6). The concave portion 2f is formed so as to extend from the inflow opening 2c to the outflow opening 2d and such that a width in the vertical direction becomes wide, and communicates with two inflow openings 2c and 2c on the upper side or the lower side, which are arranged up and down on one end side, and the other end side thereof communicates with two outflow openings 2d and 2d on the upper side or the lower side, which are arranged up and down to correspond to the inflow openings 2c and 2c. Each of the inflow openings 2c and 2c on one end side of the concave portion 2f is made such that a width in the vertical direction is smaller than the width in the vertical direction of the concave portion 2f, and each of the outflow openings 2d and 2d on the other end side of the concave portion 2f is also made such that a width in the vertical direction is smaller than the width in the vertical direction of the concave portion 2f. The rib portion 2e between the upper and lower concave portions 2f and 2f is formed to extend in a direction toward the outflow opening 2d from the inflow opening 2c and becomes flush with (has a face having the same height as) the flat plate face in which the concave portion 2f is not provided, thereby being made to be high with respect to the concave portion 2f.

The second flat plate member 2b is a flat plate having the same size as the first flat plate member 2a, as shown in FIGS. 3 and 4. A flat plate face of the second flat plate member 2b and the face on the side having the concave portion 2f of the first flat plate member 2a are overlapped and joined, whereby the concave portion 2f is covered, thereby becoming an internal space of the flat plate cooling section 2, and the internal space becomes a cooling water flow path which extends in the longitudinal directions of the flat plate members 2a and 2b. In other words, a flow path of the flat plate cooling section 2 is formed by making the first flat plate member 2a itself be a non-flat plate shape (a shape having the concave portion 2f). Joining of the first flat plate member 2a and the second flat plate member 2b is, for example, diffusion joining or thermal joining and the flat plate cooling section 2 has a two-layer laminated structure.

The inflow section 3 has an upper portion 3b formed in a rectangular parallelepiped shape and a lower portion 3c formed in a rectangular parallelepiped shape and formed so as to extend downward from the lower surface of the upper portion 3b and become small by narrowing the upper portion 3b from both sides in a thickness direction (the left-and-right direction in FIG. 2), as shown in FIGS. 1 and 2. In the upper portion 3b of the inflow section 3, an inflow opening 3a for inflow of the cooling water, which is opened in the upper surface and extends downward, is provided. Further, the lower portion 3c of the inflow section 3 has the same thickness as the thickness of the coil 5 and is made so as to be pinched by the two flat plate cooling sections 2. Then, the inflow section 3 is installed by being connected to the flat plate cooling sections 2 by bolt fastening, for example, with an O-ring interposed between the flat plate cooling sections 2 and the inflow section 3, in a state where the lower portion 3c of the inflow section 3 is pinched by the two flat plate cooling sections 2 and the lower surface of the upper portion 3b of the inflow section 3 comes into contact with the upper surfaces of the flat plate cooling sections 2. Further, in the side surfaces of the lower portion 3c of the inflow section 3, a plurality of through-holes for communication with the respective inflow openings 2c is formed, and when the inflow section 3 is installed at the flat plate cooling section 2, the through-holes communicate with the inflow openings 2c of the flat plate cooling section 2, as shown in FIG. 2.

In other words, the inflow section 3 has a plurality of through-holes communicating with a plurality of inflow openings 2c. Further, the inflow section 3 is provided with the inflow opening 3a for introducing the cooling water into the inflow section 3 itself and has a branch structure for introducing the cooling water introduced into the inside, into the plurality of through-holes.

The outflow section 4 has an upper portion 4b formed in a rectangular parallelepiped shape and a lower portion 4c formed in a rectangular parallelepiped shape and formed so as to extend downward from the lower surface of the upper portion 4b and become small by narrowing the upper portion 4b from both sides in a thickness direction, as shown in FIG. 1, similarly to the inflow section 3. In the upper portion 4b of the outflow section 4, an outflow opening 4a for outflow of the cooling water, which is opened in the upper surface and extends downward, is provided. Further, the outflow section 4 is made so as to be installed at the flat plate cooling section 2 by pinching the lower portion 4c thereof by the two flat plate cooling sections 2, similarly to the inflow section 3. Further, in the side surfaces of the lower portion 4c of the outflow section 4, a plurality of through-holes for communication with the outflow openings 2d are formed, and when the outflow section 4 is installed at the flat plate cooling section 2, the through-holes communicate with the outflow openings 2d of the flat plate cooling section 2.

In other words, the outflow section 4 has a plurality of through-holes that communicates with a plurality of outflow openings 2d. Further, the outflow section 4 is provided with the outflow opening 4a for discharging the cooling water from the outflow section 4 itself and has a confluence structure which makes the cooling water flowing into the plurality of through-holes join together and leads the cooling water to the outflow opening 4a.

Therefore, if the cooling water flows in from the inflow opening 3a in a state where the outflow section 4 and the inflow section 3 are installed with respect to the flat plate cooling section 2, the cooling water passes through the inflow openings 2c and 2c of the flat plate cooling section 2, flows through the concave portions 2f and 2f that are the internal spaces, and passes through the outflow openings 2d and 2d, and then flows out from the outflow opening 4a of the outflow section 4 to the outside.

Then, the coil 5 which is pinched by the flat plate cooling sections 2 constituting the linear motor cooling structure 100 is retained in close contact with the flat plate cooling sections 2 by adhesion, a frictional force, or joining, here.

As described above, according to the linear motor cooling structure 100 related to the first embodiment, since the flat plate cooling sections 2 each configured in a flat plate shape and having the flow path 2f through which the cooling water flows, inside, retain the coil 5, the linear motor cooling structure 100 has both a function to cool the coil 5 and a function to retain the coil 5, and thus a holder or the like for retaining a coil becomes unnecessary. Therefore, the configuration of a cooling structure can be simplified. Then, since the flat plate cooling sections 2 retain the coil 5 in direct close contact with the coil 5, the coil 5 can be efficiently cooled.

Further, according to the linear motor cooling structure 100 related to the first embodiment, the flat plate face of the flat plate cooling section 2 and the inflow section 3 overlap in the thickness direction (the lower portion 3c of the inflow section 3 is pinched by the two flat plate cooling sections 2 in the thickness direction), whereby the inflow opening 2c and the inflow section 3 communicate with each other, and the flat plate face of the flat plate cooling section 2 and the outflow section 4 overlap in the thickness direction (the lower portion 4c of the outflow section 4 is pinched by the two flat plate cooling sections 2 in the thickness direction), whereby the outflow opening 2d and the outflow section 4 communicate with each other. Therefore, a cooling structure is completed only by overlapping the inflow section 3 and the outflow section 4 with the flat plate face of the flat plate cooling section 2, and thus the configuration of a cooling structure can be further simplified.

Further, according to the linear motor cooling structure 100 related to the first embodiment, since the flat plate cooling section 2 is provided by two and the two flat plate cooling sections 2 pinch and retain the coil 5, the configuration of a cooling structure can be further simplified.

Further, according to the linear motor cooling structure 100 related to the first embodiment, since the flat plate cooling section 2 having a flow path through which the cooling water flows, inside, is configured only by overlapping the first and second flat plate members 2a and 2b, the configuration of a cooling structure can be further simplified. Then, since such a flat plate cooling section performs cooling in direct close contact with the coil, the coil can be efficiently cooled.

Further, according to the linear motor cooling structure 100 related to the first embodiment, since the first flat plate member 2a has the inflow openings 2c and the outflow openings 2d which respectively are two or more (here, two) with respect to a single flow path 2f, the cooling water more evenly flows through the inside (the concave portion 2f) of the flat plate cooling section 2, compared to a case where each of an inflow opening and an outflow opening is one, and thus the coil 5 can be more efficiently cooled. Specifically, in a case where each of the inflow opening 2c and the outflow opening 2d is provided one with respect to a single flow path 2f, cooling water flows so as to diffuse to spread from the inflow opening 2c to a longitudinal central portion of the flow path 2f and then converge toward the outflow opening 2d. However, in the vicinity of the inflow opening 2c and the outflow opening 2d (around ends of the flat plate cooling section 2), the cooling water does not evenly flow, and as a result, a biased temperature distribution is made. In contrast to this, in the configuration of the first embodiment, it is confirmed from simulation that the cooling water substantially evenly flows even in the vicinity of the inflow opening 2c and the outflow opening 2d, and thus a uniform temperature distribution is made.

Further, according to the linear motor cooling structure 100 related to the first embodiment, since the flow path 2f is formed in plural (here, two) and the flow paths 2f are separated with respect to an adjacent flow path through the rib portion 2e, in a state where the width in the vertical direction of a cooling water flow path is narrowed by the rib portion 2e, compared to a case where there is no rib portion 2e and a single flow path is provided, the cooling water efficiently flows in a direction extending from the inflow opening 2c to the outflow opening 2d in each flow path, and thus the coil 5 can be even more efficiently cooled. Further, in a case where the inflow opening 2c and the outflow opening 2d are provided in plural and there is no rib portion 2e, it is confirmed that the flow of cooling water interferes with each other and thus turbulence is generated. In contrast to this, in the configuration of the first embodiment, it is confirmed from simulation that the rib portion 2e is provided, whereby interference of the cooling water can be suppressed and thus generation of turbulence is suppressed.

Further, since the first flat plate member 2a has the rib portion 2e between the concave portions 2f, the flat plate cooling section 2 has high withstanding pressure and deformation with an increase in internal pressure can be suppressed.

Further, the inflow section 3 has, at the lower portion 3c thereof, a plurality of through-holes communicating with the respective inflow openings 2c of the flat plate cooling section 2 and the cooling water which has flowed in from the inflow opening 3a branches and flows into each inflow opening 2c. In this manner, since the inflow section 3 has a branch structure like a so-called manifold, it is possible to make the cooling water equally flow into the respective inflow openings 2c, and thus the inflow section 3 has a structure suitable for a case where a plurality of inflow openings 2c is provided.

Figure 7:
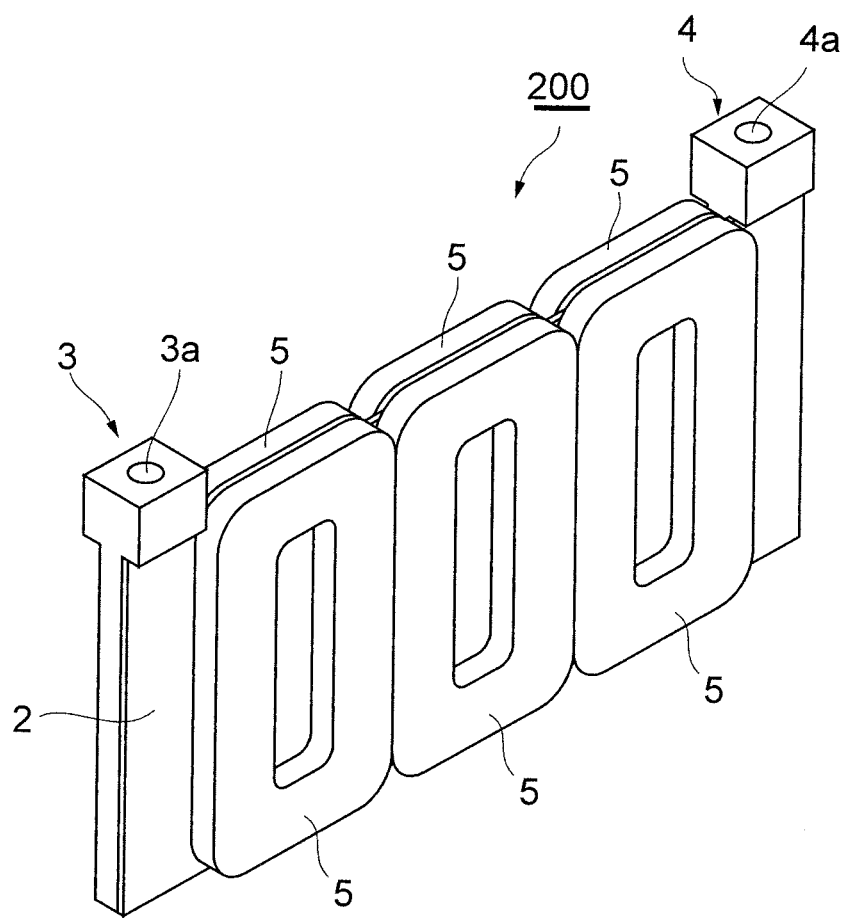
FIG. 7 is a perspective view showing a linear motor cooling structure according to another embodiment of the present invention.

Next, a linear motor cooling structure 200 according to a second embodiment will be described referring to FIG. 7. The linear motor cooling structure 200 according to the second embodiment is different from the linear motor cooling structure 100 according to the first embodiment in that the coils 5 facing each other are provided in a set and the flat plate cooling section 2 is interposed between the coils 5 facing each other, thereby retaining the coils 5 on both sides.

The linear motor cooling structure 200 according to the second embodiment is the same as the linear motor cooling structure 100 according to the first embodiment except for the above-described point, and the cooling water for cooling the coil 5 flows in from the inflow opening 3a of the inflow section 3, flows into the concave portion 2f that is an internal space through the inflow opening 2c of the flat plate cooling section 2, passes through the outflow opening 2d, and then flows out from the outflow opening 4a of the outflow section 4 to the outside.

In the second embodiment, in addition to the same effects as those in the first embodiment, since a configuration is made in which the flat plate cooling section 2 is interposed between the coils 5 facing each other, thus retaining the coils 5 that face each other, the configuration of a cooling structure can be simplified.

Figure 8:
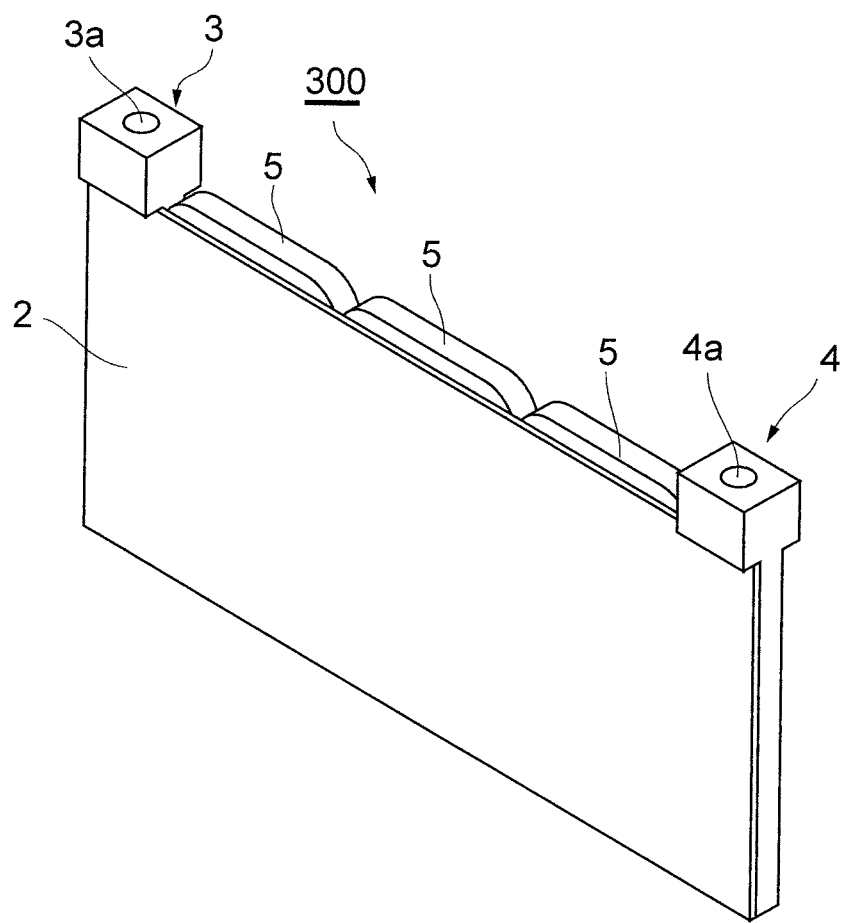
FIG. 8 is a perspective view showing a linear motor cooling structure according to still another embodiment of the present invention.

Next, a linear motor cooling structure 300 according to a third embodiment will be described referring to FIG. 8. The linear motor cooling structure 300 according to the third embodiment is different from the linear motor cooling structures 100 and 200 according to the first and second embodiments in that the flat plate cooling section 2 retains the coil 5 by bringing the coil 5 into close contact with one face of the flat plate faces thereof.

The linear motor cooling structure 300 according to the third embodiment is the same as the linear motor cooling structures 100 and 200 according to the first and second embodiments except for the above-described point, and the flow of the cooling water is the same as that in the second embodiment.

In the third embodiment, in addition to the same effects as those in the first and second embodiments, since a configuration is made in which the flat plate cooling section 2 retains the coil 5 by bringing the coil 5 into close contact with one face of the flat plate faces thereof, the configuration of a cooling structure can be simplified, similarly to the first and second embodiments.

Figure 9:
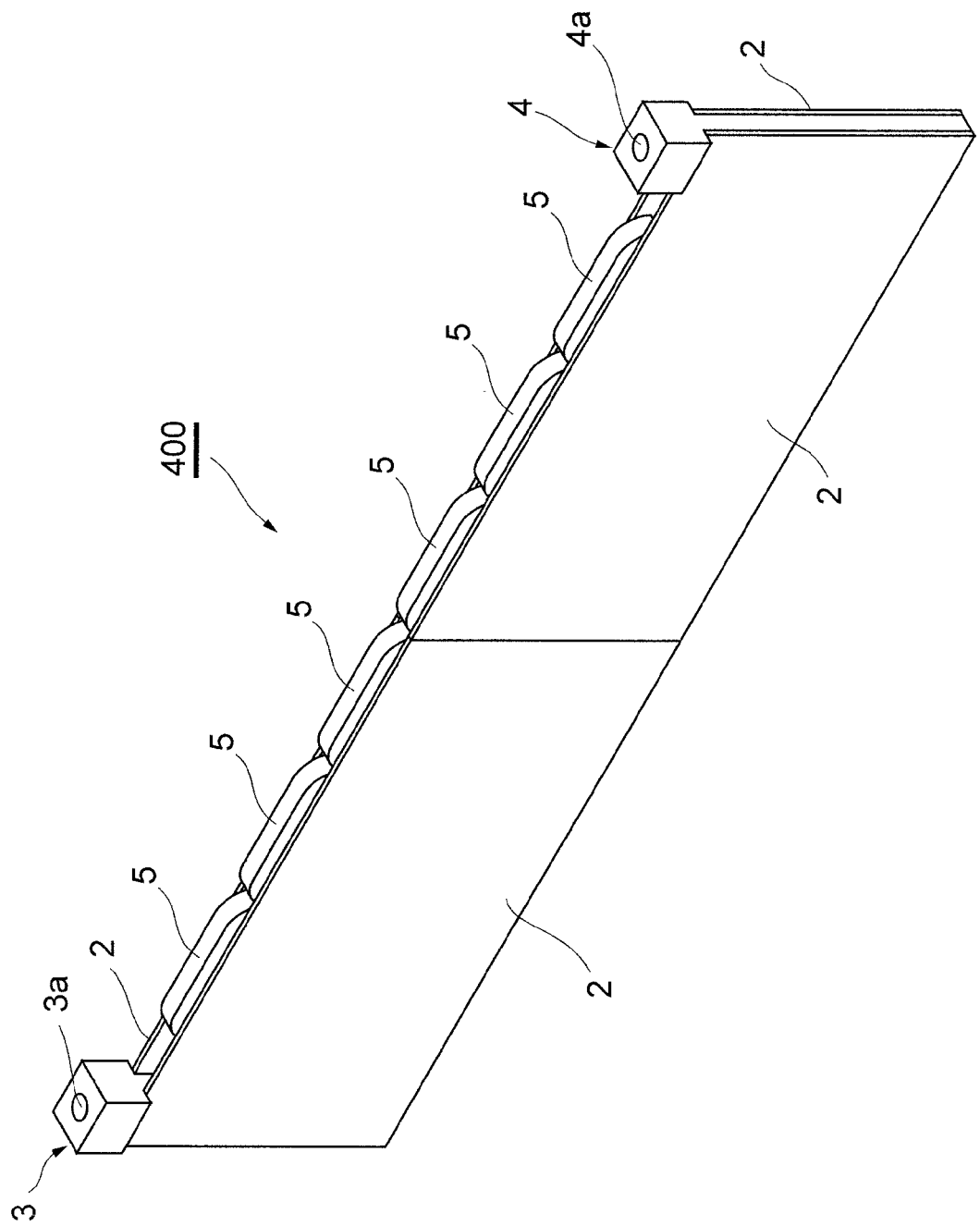
FIG. 9 is a perspective view showing a linear motor cooling structure according to still yet another embodiment of the present invention.

Next, a linear motor cooling structure 400 according to a fourth embodiment will be described referring to FIG. 9. The linear motor cooling structure 400 according to the fourth embodiment is different from the linear motor cooling structure 100 according to the first embodiment in that the flat plate cooling section 2 is provided in plural in a longitudinal direction and the flat plate cooling sections 2 are made capable of being connected to each other.

Specifically, the flat plate cooling sections 2 are made capable of being connected to each other in a direction in which the coils 5 are arranged, and, for example, a downstream end (a right end) of the flat plate cooling section 2 on the upstream side (the left side) having the inflow section 3 and an upstream end (a left end) of the flat plate cooling section 2 on the downstream side (the right side) having the outflow section 4 are brought into contact with each other and connected, whereby the outflow opening 2d of the flat plate cooling section 2 on the upstream side and the inflow opening 2c of the flat plate cooling section 2 on the downstream side are made to communicate with each other. Therefore, the cooling water which has flowed in from the inflow opening 3a of the inflow section 3 flows into the concave portion 2f and the outflow opening 2d through the inflow opening 2c of the flat plate cooling section 2 on the upstream side, flows into the concave portion 2f and the outflow opening 2d through the inflow opening 2c of the flat plate cooling section 2 on the downstream side, and then flows out from the outflow opening 4a of the outflow section 4.

In the fourth embodiment, in addition to the same effects as those in the first embodiment, a cooling structure extending in a direction in which a plurality of coils 5 is arranged can be easily configured by connecting a plurality of flat plate cooling sections 2 and also connecting the inflow section 3 to the flat plate cooling section 2 of an end on one side and the outflow section 4 to the flat plate cooling section 2 of an end on the other side. Therefore, it is possible to easily configure a cooling structure in accordance with the coil. In addition, such a connection configuration can also be applied to the second and third embodiments.

Figure 10:
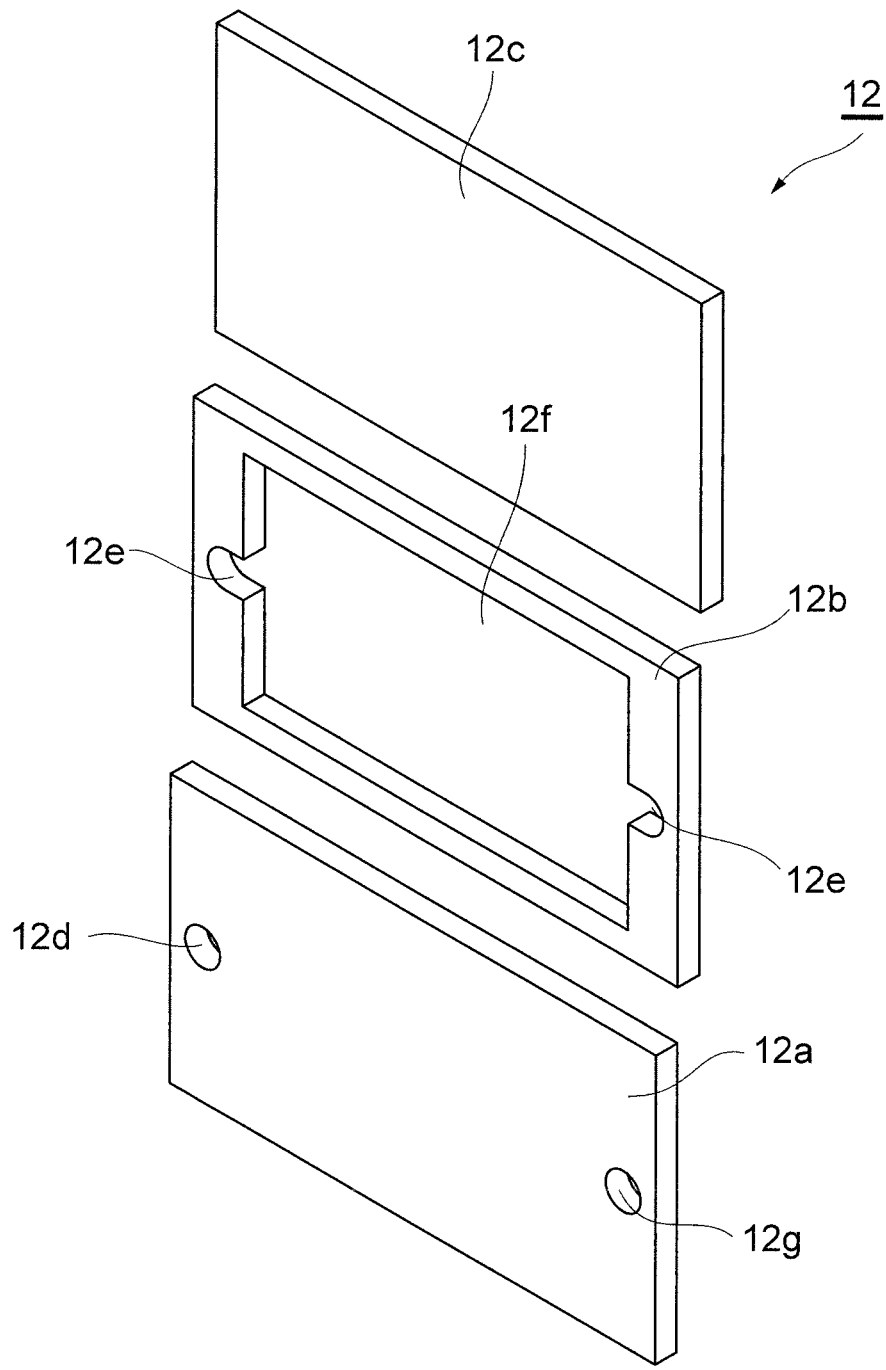
FIG. 10 is an exploded perspective view showing a flat plate cooling section of a linear motor cooling structure according to further embodiment of the present invention.

Next, a linear motor cooling structure according to a fifth embodiment will be described referring to FIG. 10. The linear motor cooling structure according to the fifth embodiment is different from the linear motor cooling structure 100 according to the first embodiment in that in place of the flat plate cooling section 2 which includes the first flat plate member 2a and the second flat plate member 2b, a flat plate cooling section 12 having three rectangular flat plate members, a first flat plate member 12a, a second flat plate member 12b, and a third flat plate member 12c, is used. The first, second, and third flat plate members 12a, 12b, and 12c have the same size.

The first flat plate member 12a has an inflow opening 12d which is formed to penetrate a flat place face on one end side in a longitudinal direction thereof, and an outflow opening 12g which is formed to penetrate the flat place face on the other end side in the longitudinal direction.

The second flat plate member 12b has an opening 12f which is formed to penetrate a flat place face thereof in a rectangular shape, and concave portions 12e and 12e which are respectively formed so as to be further recessed from both left and right end portions of the opening 12f to both left and right end sides. The concave portions 12e and 12e are provided at positions corresponding to the inflow opening 12d and the outflow opening 12g. If the flat plate face of the first flat plate member 12a and the flat plate face of the second flat plate member 12b are overlapped, the inflow opening 12d and the concave portion 12e on the left side communicate with each other and the outflow opening 12g and the concave portion 12e on the right side communicate with each other.

Then, if the three flat plate members 12a, 12b, and 12c are overlapped, the opening 12f is interposed between the first flat plate member 12a and the third flat plate member 12c, and thus both sides thereof are blocked, whereby an internal space of the flat plate cooling section 12 is formed, and the internal space becomes a cooling water flow path. In other words, the second flat plate member 12b having a non-flat plate shape (having the opening 12f) is interposed between the first and third flat plate members 12a and 12c so as to form a portion of overlapping members, whereby a flow path of the flat plate cooling section 12 is formed. In this manner, the flat plate cooling section 12 has a three-layer laminated structure.

The flat plate cooling section 12 is made so as to be able to install the inflow section 3 and the outflow section 4 thereat, similarly to the flat plate cooling section 2 in the first to fourth embodiments, and when the inflow section 3 is installed, the inflow opening 3a and the inflow opening 12d communicate with each other, and when the outflow section 4 is installed, the outflow opening 4a and the outflow opening 12g communicate with each other. Accordingly, if the cooling water flows in from the inflow opening 3a of the inflow section 3, the cooling water flows from the inflow opening 12d into the opening 12f, flows out into the outflow section 4 through the outflow opening 12g, and then flows out to the outside.

Therefore, also in the linear motor cooling structure according to the fifth embodiment having such a configuration, the same effects as those in the first to fourth embodiments can be obtained. In addition, the flat plate cooling section 12 constituting the linear motor cooling structure according to the fifth embodiment can be used in place of the flat plate cooling section 2 in the first to fourth embodiments.

Further, in the fifth embodiment, since the flat plate cooling section 12 has the concave portions 12e and 12e which are respectively formed to be further recessed from both left and right end portions of the opening 12f to both left and right end sides and is made such that the inflow opening 12d and the (inflow side) concave portion 12e on the left side (of one end) communicate with each other and the outflow opening 12g and the (outflow side) concave portion 12e on the right side (of the other end) communicate with each other, the cooling water which has flowed from the inflow opening 12d into the (inflow side) concave portion 12e on the left side is blocked by wall portions of the second flat plate member 12b, which are present at the top and bottom and the left side of the concave portion 12e, and more suitably flows in a direction toward the outflow opening 12g. Then, the cooling water which has flowed to the (outflow side) concave portion 12e on the right side is blocked by wall portions of the second flat plate member 12b, which are present at the top and bottom and the right side of the concave portion 12e, and more suitably enters the outflow opening 12g.

In this manner, in the fifth embodiment, since the flat plate cooling section 12 has wall portions at portions which are portions around the inflow opening 12d and the outflow opening 12g and at portions other than a portion that is connected to the flow path, the cooling water can efficiently flow in a direction extending from the inflow opening 12d to the outflow opening 12g and efficiently cool the coil 5. Incidentally, the operation and effects by the wall portions are also likewise generated in the flat plate cooling section 2 in the first to fourth embodiments. In addition, the concave portions 12e and 12e may be omitted, and, for example, by lengthening the length in a longitudinal direction of the opening 12f (lengthening the length of the opening 12f so as to extend to end edges of the concave portions 12e and 12e), a configuration may also be made such that the inflow opening 12d and the opening 12f communicate with each other and the outflow opening 12g and the opening 12f communicate with each other. However, a case where the concave portion 12e is provided is advantageous in terms of obtaining the above-described effect and enhancing rigidity.

Here, although description has been made using the fifth embodiment, the same structure may also be adopted in the linear motor cooling structure according to the first embodiment, as shown in FIG. 6, and other embodiments may also be provided with the same structure.

Although the present invention has been specifically described above on the basis of the embodiments thereof, the invention is not limited to the embodiments described above. For example, in the embodiments described above, as a particularly preferable configuration, a configuration is made such that the inflow opening 2c of the flat plate cooling section 2 and the inflow section 3 communicate with each other by overlapping the flat plate face of the flat plate cooling section 2 and the inflow section 3 in the thickness direction. However, there is no limitation thereto, and a configuration may also be made such that, for example, a side end face of the flat plate cooling section 2 and the inflow section 3 communicate with each other by overlapping the side end face of the flat plate cooling section 2 and the inflow section 3. The same applies to the relationship between the flat plate cooling section 2 and the outflow section 4.

Further, in the embodiments described above, as a particularly preferable configuration, an example has been described in which each of the inflow opening 2c and the outflow opening 2d is provided by four to be arranged up and down, two concave portions 2f are provided in a pair up and down, one end side of the concave portion 2f communicates with two inflow openings 2c, and the other end side of the concave portion 2f communicates with two outflow openings 2d. However, the number of inflow openings 2c, outflow openings 2d, and concave portions 2f or an aspect of a cooling water flow path is not limited to the above description. Further, also with respect to the rib portion 2e partitioning the concave portions 2f, it is possible to change the number, the shape, or the like thereof.

Further, as functions of the inflow section 3 and the outflow section 4, functions of introduction and lead-out of the cooling water to and from the flat plate cooling section 2 are given. However, here, in the case of a moving coil (a linear motor of a type in which a coil moves by an action between a magnet and the coil), a so-called yoke (the combination of a magnet and a magnetic body) sometimes has a closed shape. In this case, the coil is sometimes disposed in the inside of the closed shape, and in this case, it is sometimes preferable that introduction of cooling water for cooling the coil be performed from above. In this case, introduction and lead-out of the cooling water can be performed from inflow and outflow places provided on the upper face sides of an inflow section and an outflow section. Then, as a form for maintaining a function of a flat plate cooling section, in a case of wanting to introduce cooling water from a horizontal direction, the inflow section and the outflow section have flow path shapes changing an inflow direction of the cooling water, whereby it can be achieved. In the present invention, it may be performed by the embodiment as shown particularly in FIGS. 2 and 6.

In addition, in the embodiments described above, the linear motor in which the coil side moves has been described as an example. However, the present invention may also be applied to a linear motor in which the magnet side moves.

It should be understood that the invention is not limited to the above-described embodiment, but may be modified into various forms on the basis of the spirit of the invention. Additionally, the modifications are included in the scope of the invention.

What is claimed is:

1. A linear motor cooling structure for cooling a coil constituting a driving section of a linear motor, comprising:

a flat plate cooling section which forms a flow path for cooling water for cooling the coil inside between a plurality of flat plate members by overlapping the plurality of flat plate members, wherein a space is formed between the plurality of flat plate members by joining a flat plate surface of a first flat plate member to a surface on a side of a second flat plate member having a concave part so as to cover the concave part; and a plurality of flow paths for the cooling water formed in the space, wherein the flat plate cooling section includes an inflow opening for inflow of the cooling water and an outflow opening for outflow of the cooling water, which are respectively provided at both ends thereof, wherein the plurality of flow paths are separated via a partition portion with respect to adjacent flow paths, and the flat plate cooling section has a plurality of the inflow openings and a plurality of the outflow openings, with respect to each of the flow path, wherein the concave part extends from the plurality of inflow openings to the plurality of outflow openings, wherein the plurality of inflow openings and the plurality of outflow openings have a width in a vertical direction that is smaller than the width in the vertical direction of the concave part of the second flat plate, and wherein the flat plate cooling section comes into close contact with the coil.

2. The linear motor cooling structure according to claim 1, wherein the inflow opening and the outflow opening are formed as through-holes penetrating in a direction perpendicular to a face of the flat plate member.

3. The linear motor cooling structure according to claim 1, wherein the flow path of the flat plate cooling section is formed by interposing a member having a non-flat plate shape between the plurality of flat plate members so as to form a portion of overlapping members, or by making the flat plate member itself be a non-flat plate shape.

4. The linear motor cooling structure according to claim 1, further comprising: an inflow section and an outflow section, each of which includes a plurality of through-holes that communicates with the plurality of inflow openings and the plurality of outflow openings.

5. The linear motor cooling structure according to claim 4, wherein the inflow section includes an inflow opening for introducing the cooling water into the inflow section itself and is provided with a branch structure for introducing the cooling water that has flowed into an inside thereof into the plurality of through-holes.

6. The linear motor cooling structure according to claim 4, wherein the outflow section includes an outflow opening for discharging the cooling water from the outflow section itself and is provided with a confluence structure which makes the cooling water flowing into the plurality of through-holes join together and leads the cooling water to the outflow opening.

7. The linear motor cooling structure according to claim 1, wherein the flat plate cooling section includes wall portions at portions which are portions around the inflow opening and the outflow opening and at portions other than a portion that is connected to the flow path.

* * * * *